US012005919B2

(12) United States Patent
Yasuda et al.

(10) Patent No.: US 12,005,919 B2
(45) Date of Patent: Jun. 11, 2024

(54) VARYING EXTENDED REALITY CONTENT BASED ON RISK LEVEL OF A DRIVING ENVIRONMENT

(71) Applicant: Toyota Research Institute, Inc., Los Altos, CA (US)

(72) Inventors: Hiroshi Yasuda, San Francisco, CA (US); Simon A. I. Stent, Cambridge, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 156 days.

(21) Appl. No.: 17/677,125

(22) Filed: Feb. 22, 2022

(65) Prior Publication Data

US 2023/0264706 A1 Aug. 24, 2023

(51) Int. Cl.
| | |
|---|---|
| *B60W 50/14* | (2020.01) |
| *B60K 35/00* | (2006.01) |
| *B60W 40/02* | (2006.01) |
| *G02B 27/01* | (2006.01) |
| *G06T 19/00* | (2011.01) |

(Continued)

(52) U.S. Cl.
CPC ............ *B60W 50/14* (2013.01); *B60K 35/00* (2013.01); *B60W 40/02* (2013.01); *G02B 27/017* (2013.01); *G06T 19/006* (2013.01); *G06V 20/20* (2022.01); *G06V 20/56* (2022.01); *B60K 35/22* (2024.01); *B60K 35/28* (2024.01); *B60K 35/81* (2024.01); *B60K 2360/165* (2024.01); *B60K 2360/176* (2024.01); *B60K 2360/177* (2024.01); *B60W 2050/146* (2013.01)

(58) Field of Classification Search
CPC ............... B60W 50/14; B60W 40/02; B60W 2050/146; G06V 20/20; G06V 20/56; B60K 35/00; B60K 2370/165; B60K 2370/177; B60K 2370/152; B60K 2370/176; B60K 2370/52; G02B 27/017; G06T 19/006
See application file for complete search history.

(56) References Cited

U.S. PATENT DOCUMENTS

| 5,661,454 A | 8/1997 | Bezard et al. |
| 9,239,615 B2 | 1/2016 | Frank et al. |

(Continued)

FOREIGN PATENT DOCUMENTS

| EP | 2714456 B1 | 2/2017 |
| EP | 3240715 B1 | 12/2018 |

OTHER PUBLICATIONS

Yasuda et al., U.S. Appl. No. 17/676,995, filed Feb. 22, 2022.

*Primary Examiner* — Chico A Foxx
(74) *Attorney, Agent, or Firm* — Christopher G. Darrow; Darrow Mustafa PC (57) ABSTRACT

Extended reality content in a video can be varied based on a risk level of an external environment of a vehicle. The video can be of an external environment of a vehicle can be presented in real-time on a display located within the vehicle. The display can be a video pass through display. The display can be an in-vehicle display, or it can be a part of a video pass-through extended reality headset. The video can present a view of an external environment of the vehicle as well as extended reality content. A risk level of the external environment of the vehicle can be determined. An amount of the extended reality content presented in the video can be varied based on the risk level.

20 Claims, 4 Drawing Sheets

(51) Int. Cl.
  *G06V 20/20* (2022.01)
  *G06V 20/56* (2022.01)
  *B60K 35/22* (2024.01)
  *B60K 35/28* (2024.01)
  *B60K 35/81* (2024.01)

(56) References Cited

U.S. PATENT DOCUMENTS

| | | |
|---|---|---|
| 9,809,165 B1 | 11/2017 | Misu et al. |
| 10,101,742 B2 | 10/2018 | Prokhorov |
| 10,231,614 B2 | 3/2019 | Krueger |
| 10,424,117 B2 | 9/2019 | Li et al. |
| 10,552,695 B1 | 2/2020 | Bush et al. |
| 10,564,714 B2 | 2/2020 | Marggraff et al. |
| 10,717,406 B2 | 7/2020 | Thieberger et al. |
| 10,746,987 B2 | 8/2020 | Lewis |
| 10,764,554 B2 | 9/2020 | Alaniz et al. |
| 10,977,865 B2 | 4/2021 | Yasrebi |
| 11,127,373 B2 | 9/2021 | Wan et al. |
| 11,538,224 B2 | 12/2022 | Holz et al. |
| 11,734,867 B2 | 8/2023 | Mirhosseini et al. |
| 2002/0184236 A1* | 12/2002 | Donath .................... B60R 1/00 |
| 2011/0169625 A1 | 7/2011 | James et al. |
| 2013/0058529 A1 | 3/2013 | Levin et al. |
| 2013/0335301 A1* | 12/2013 | Wong .................... G06T 19/006 |
| | | 345/8 |
| 2015/0077562 A1 | 3/2015 | Heckel et al. |
| 2015/0283902 A1 | 10/2015 | Tuukkanen |
| 2016/0110618 A1 | 4/2016 | Oba |
| 2016/0267720 A1 | 9/2016 | Mandella et al. |
| 2017/0103571 A1 | 4/2017 | Beaurepaire |
| 2017/0113702 A1 | 4/2017 | Thieberger-Navon et al. |
| 2017/0202501 A1 | 7/2017 | Kuwahara et al. |
| 2017/0240109 A1 | 8/2017 | Kimura |
| 2017/0278313 A1 | 9/2017 | Maslar et al. |
| 2017/0329329 A1 | 11/2017 | Kamhi et al. |
| 2018/0040162 A1 | 2/2018 | Donnelly et al. |
| 2018/0322783 A1 | 11/2018 | Toyoda et al. |
| 2019/0011703 A1* | 1/2019 | Robaina ................ G02B 27/01 |
| 2019/0225236 A1 | 7/2019 | Hashimoto et al. |
| 2019/0248288 A1 | 8/2019 | Oba |
| 2020/0031339 A1* | 1/2020 | Tanaka .................... B60W 30/16 |
| 2020/0189459 A1 | 6/2020 | Bush et al. |
| 2020/0258480 A1 | 8/2020 | Bronder et al. |
| 2020/0394846 A1 | 12/2020 | Diament et al. |
| 2020/0406754 A1 | 12/2020 | Kassner et al. |
| 2021/0269055 A1* | 9/2021 | Kokido ................ B60W 50/16 |
| 2021/0283496 A1 | 9/2021 | Mandella et al. |
| 2022/0130348 A1* | 4/2022 | Katsurada ............. G06F 3/0486 |
| 2022/0219683 A1* | 7/2022 | Chikamori ........ B60W 60/0015 |
| 2023/0018303 A1 | 1/2023 | Itou et al. |
| 2023/0319140 A1* | 10/2023 | Tran .................. B60W 60/0015 |
| | | 709/203 |

* cited by examiner

```
Determining a risk level of a driving environment
210
              │
              ▼
Causing an amount of the extended reality content presented in
the video to be varied based on the risk level of the driving
environment
220
```

FIG. 7

VARYING EXTENDED REALITY CONTENT BASED ON RISK LEVEL OF A DRIVING ENVIRONMENT

FIELD

The subject matter described herein relates in general to extended reality devices and, more particularly, extended reality devices used in a vehicular environment.

BACKGROUND

A head-mounted display (HMD) is a device that includes a display and is configured to be worn on a person's head. Examples of HMDs include a virtual reality (VR) headset or a video pass through headset. With a VR headset, virtual reality is presented to a wearer for entertainment or other purposes. With a video pass through headset, video is fed into the headset so that the wearer can perceive the real-world environment.

SUMMARY

In one respect, the present disclosure is directed to a method of varying extended reality content in a video presented on a display located within a vehicle. The display can be a video pass through display. The video can include extended reality content. The method includes determining a risk level of an external environment of the vehicle. The method further includes causing an amount of the extended reality content presented in the video to be varied based on the risk level.

In another respect, the present disclosure is directed to a system for varying extended reality content in a video. The system can include a display located within a vehicle. The display can be a video pass through display. The system can include one or more cameras. The one or more cameras can be configured to capture a video of the external environment of the vehicle. The system can include one or more processors operatively connected to the one or more cameras and to the display. The one or more processors can be programmed to initiate executable operations. The executable operations can include causing the video captured by the one or more cameras to be presented on the display. The video can include extended reality content. The executable operations can include determining a risk level of an external environment of the vehicle. The executable operations can include causing an amount of the extended reality content presented in the video to be varied based on the risk level.

DETAILED DESCRIPTION

Extended reality (XR) refers to any combination of real-and-virtual environments. Examples of XR include augmented reality (AR), mixed reality (MR), virtual reality (VR), and any type of reality in between these types of XR. XR can be incorporated into a head mounted display. For example, with a video pass through XR headset, real-time video of the real-world environment can be passed through to the headset. The video can be augmented in some manner, such as by providing further content in place of, in addition to, and/or a modification of real-world video content. For example, a style transfer algorithm can be applied to the real-world video content.

If an XR headset wearer is a driver of an autonomous vehicle, there may be times in which the driver must pay attention to the driving environment or must take control of the vehicle. In such instances, the XR content in the video feed may further distract or disengage the driver from the real-world environment.

Accordingly, arrangements described herein are directed to varying XR content presented in a video. The display can be located in a vehicle. A risk level of an external environment of the vehicle can be determined. An amount of the XR content presented in the video can be caused to be varied based on the risk level. The display can be a video pass through display. In some instances, the display can be part of an extended reality headset or an in-vehicle display.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
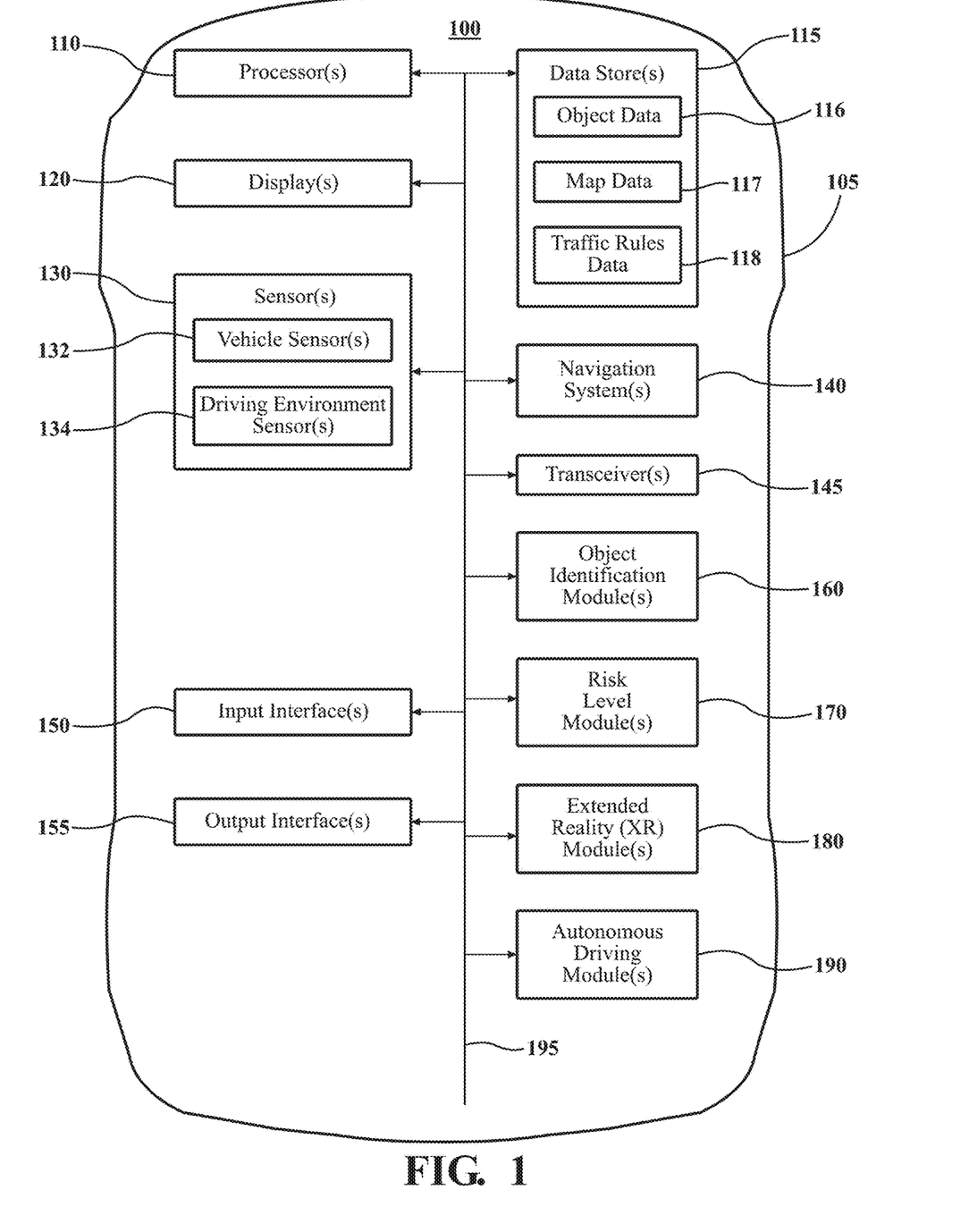
FIG. 1 is an example of a system for varying extended reality content.

FIG. 1 is an example of a system 100 for varying extended reality content. The system 100 can be incorporated into a vehicle 105. As used herein, "vehicle" means any form of motorized or powered transport. In one or more implementations, the vehicle 105 can be an automobile, a land-based craft, a watercraft, an aircraft, or any other form of motorized or powered transport. The vehicle 105 may be operated manually by a human driver, semi-autonomously by a mix of manual inputs from a human driver and autonomous inputs by one or more vehicle computers, fully autonomously by one or more vehicle computers, or any combination thereof. The vehicle 105 can be configured to switch between these different operational modes.

In one or more arrangements, the vehicle 105 can operate autonomously according to a particular defined level of autonomy. For example, the vehicle 105 can operate according to any of the Society of Automotive Engineers (SAE) SAE J3016 Levels of Driving Automation (e.g., Level 0-5). In some examples, arrangements described herein can be used in connection with SAE Levels 3 and 4. However, it will be understood that arrangements described herein are not limited in this regard. In these levels of driving automation, particularly Level 3, the vehicle may request or require a human driver to take control of the operation of the vehicle 105.

The system 100 can include various elements. Some of the possible elements of the system 100 are shown in FIG. 1 and will now be described. It will be understood that it is not necessary for the system 100 to have all of the elements shown in FIG. 1 or described herein. The system 100 can have any combination of the various elements shown in FIG. 1. Further, the system 100 can have additional elements to those shown in FIG. 1. In some arrangements, the system 100 may not include one or more of the elements shown in FIG. 1. Further, while the various elements may be located on or within a vehicle, it will be understood that one or more of these elements can be located external to the vehicle. Thus, such elements are not located on, within, or otherwise carried by the vehicle. Further, the elements shown may be physically separated by large distances. Indeed, one or more of the elements can be located remote from the vehicle 105. Some of the elements can be components of the vehicle 105 while some of the elements may not be components of the vehicle 105.

The system 100 can include one or more processors 110, one or more data stores 115, one or more displays 120, one or more sensors 130, one or more navigation systems 140, one or more transceivers 145, one or more input interfaces 150, one or more output interfaces 155, one or more object identification module(s) 160, one or more risk level module(s) 170, one or more extended reality (XR) modules 180, and/or one or more autonomous driving module(s) 190. Each of these elements will be described in turn below.

As noted above, the system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The system 100 can include one or more data stores 115 for storing one or more types of data. The data store(s) 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the data store(s) 115 can include object data 116. The object data 116 can include information about a plurality of different objects, including objects that may be found within the cabin of the vehicle 105. Examples of the object data 116 can include vehicles, people, animals, buildings, structures, roads, medians, signs, streetlights, traffic lights, traffic signs, road signs, billboards, bridges, poles, towers, trees, and/or plants, just to name a few possibilities. The object data 116 can include one or more images of the objects. The object data 116 can include size, measurements, and/or dimensions of the objects, including averages, percentiles, and ranges. The object data 116 can include any information about an object that can help to identify such an object when detected by one or more sensors.

In some arrangements, the object data 116 can include classification information about the objects in the object data 116. For instance, the classification information can include whether the object is a critical object or a non-critical object. A critical object can include an object or area that is important to the ability to safely operate the vehicle or an object or area that could be hazardous to the ability to safely operate the vehicle. A non-critical object can include an object or an area that that is not important to the ability to safely operate the vehicle or an object or area that is not hazardous to the ability to safely operate the vehicle.

In one or more arrangements, the data store(s) 115 can include map data 117. The map data 117 can include maps of one or more geographic areas. In some instances, the map data 117 can include information or data on roads, traffic control devices, road markings, streetlights, structures, features, and/or landmarks in the one or more geographic areas. The map data 117 can be in any suitable form. In some instances, the map data 117 can include aerial views of an area. In some instances, the map data 117 can include ground views of an area, including 360-degree ground views. The map data 117 can include measurements, dimensions, distances, positions, coordinates, and/or information for one or more items included in the map data 117 and/or relative to other items included in the map data 117. The map data 117 can include a digital map with information about road geometry. In one or more arrangement, the map data 117 can include information about the ground, terrain, roads, surfaces, and/or other features of one or more geographic areas. The map data 117 can include elevation data in the one or more geographic areas. The map data 117 can define one or more ground surfaces, which can include paved roads, unpaved roads, land, and other things that define a ground surface. The map data 117 can be high quality and/or highly detailed.

In one or more arrangements, the data store(s) 115 can include traffic rules data 118. The traffic rules data 118 can include one or more traffic rules. As used herein, "traffic rule" includes any law, rule, ordinance, or authority that governs the operation of a motor vehicle, including motor vehicles in motion and motor vehicles that are parked or otherwise not in motion. The traffic rules can be international, federal, national, state, city, township and/or local laws, rules, ordinances and/or authorities.

The system 100 can include one or more displays 120. The display(s) 120 can be any suitable type of display, now known or later developed. For example, the display(s) 120 can be video pass-through display(s).

In one or more arrangements, the display(s) 120 can be a part of the vehicle 105, such as a display integrated into an instrument panel or head unit of the vehicle 105. For instance, the display(s) 120 can be an infotainment display located within the vehicle 105. In some arrangements, the display(s) 120 can be formed by a projector projecting the video onto a surface within the vehicle 105, such as by a heads-up display. For instance, video can be presented on a window (e.g., front windshield, side window, etc.) or an instrument panel of the vehicle 105. In such arrangements, the video can be received from one or more driving environment sensors (e.g., cameras) of the vehicle 105. In some arrangements, the video can be received from a camera safety system for the vehicle 105.

In some arrangements, the display(s) 120 can be part of another device located in the vehicle 105 and/or operatively connected to the vehicle 105. For example, the display(s) 120 can be part of a head mounted display. As an example, the head mounted display can be an extended reality (XR) headset. In some arrangements, the XR headset can be a video pass through headset. In such a headset, video captured by one or more cameras can fed into the headset so that the wearer can perceive the real-world environment in real-time. In some arrangements, the XR headset can be a video pas through VR headset. In such a headset, video captured by one or more cameras can fed into the headset so that the wearer can perceive the real-world environment in real-time, and the video can be augmented with extended reality content.

The XR headset can be any type of XR headset, now known or later developed. The XR headset can include one or more cameras. In one or more arrangements, the camera(s) can be stereo camera(s) or any other type of camera(s). The camera(s) can be configured to capture video of the environment in front of the wearer. Thus, the camera(s) can generally correspond to the point of view of the wearer. The captured video can be passed to the display(s) 120 within the XR headset. Thus, the user can see the real-world environment through the XR headset.

The XR headset can be configured to augment the video in any suitable manner, such as by presenting XR content with the video. For instance, virtual overlays can be presented over portions of the video. As an example, virtual overlays can be presented over corresponding real-world objects in the video. The XR headset can be configured to vary the XR content presented in the video, as will be described herein. The XR headset can be configured to allow a user to selectively turn off or disable the XR content.

The display(s) 120 can be configured to present real-world video content (e.g., video from one or more driving environment sensors) as well as extended reality content (e.g., a style applied to one or more objects and/or to at least a portion of the environment in the real-world video).

In some arrangements, the display(s) 120 can be configured to present a view corresponding to a view of a driver. The view presented on the display(s) 120 can vary with movements of the driver's head and/or eyes. The display(s) 120, the device of which the display(s) 120 are a part of, and/or the vehicle 105 can include eye tracking or head tracking such that, as the field of vision of the person changes, the content presented on the display(s) 120 changes.

The system 100 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 100 includes a plurality of sensors, the sensors can work independently from each other. Alternatively, two or more of the sensors can work in combination with each other. In such case, the two or more sensors can form a sensor network.

The sensor(s) 130 can include any suitable type of sensor. Various examples of different types of sensors will be described herein. However, it will be understood that the embodiments are not limited to the particular sensors described.

The sensor(s) 130 can include one or more vehicle sensors 132. The vehicle sensor(s) 132 can be configured to detect, determine, assess, monitor, measure, quantify and/or sense information about the vehicle 105 itself (e.g., position, location, orientation, speed, acceleration, heading, etc.). As an example, the vehicle 105 can include one or more speedometers. Further, the vehicle sensor(s) 132 can be configured to detect, determine, assess, monitor, measure, quantify and/or sense information about a cabin of the vehicle 105. For instance, the vehicle sensor(s) 132 can include one or more cameras. The camera(s) can be configured to acquire vehicle cabin data, including data about one or more objects located within the cabin. The vehicle sensor(s) 132 can be any suitable sensor, now known or later developed.

The sensor(s) 130 can include one or more driving environment sensors 134. Such sensors can be used to detect, determine, assess, monitor, measure, quantify, acquire, and/or sense, directly or indirectly, something about the external environment of the vehicle 105. For instance, one or more of the driving environment sensors 134 can be used to detect, determine, assess, monitor, measure, quantify, acquire, and/or sense, directly or indirectly, the presence of one or more objects in the external environment of the vehicle 105, the position or location of each detected object relative to the vehicle 105, the distance between each detected object and the vehicle 105 in one or more directions (e.g. in a longitudinal direction, a lateral direction, and/or other direction(s)), the elevation of a detected object, the speed of a detected object, the acceleration of a detected object, the heading angle of a detected object, and/or the movement of each detected obstacle. The driving environment sensor(s) 134 can be any suitable sensor, now known or later developed. In one or more arrangements, the driving environment sensor(s) 134 can include one or more radar sensors, one or more lidar sensors, one or more sonar sensors, and/or one or more cameras.

The system 100 can include one or more navigation systems 140. The navigation system(s) 140 can include a global positioning system, a local positioning system or a geolocation system. The navigation system(s) 140 can be implemented with any one of a number of satellite positioning systems, now known or later developed, including, for example, the United States Global Positioning System (GPS). Further, the navigation system(s) 140 can use Transmission Control Protocol (TCP) and/or a Geographic information system (GIS) and location services. For example, the GPS can include a GPS transceiver to determine the vehicle's latitude, longitude and/or altitude.

The system 100 can include one or more transceivers 145. As used herein, "transceiver" is defined as a component or a group of components that transmit signals, receive signals, or transmit and receive signals, whether wirelessly or through a hard-wired connection. The transceiver(s) 145 can enable communications between the vehicle 105 and other vehicles in an external environment. The transceiver(s) 145 can be any suitable transceivers used to access a network, access point, node or other device for the transmission and receipt of data. The transceiver(s) 145 may be wireless transceivers using any one of a number of wireless technologies, now known or in the future.

The system 100 can include one or more input interfaces 150. An "input interface" includes any device, component, system, element or arrangement or groups thereof that enable information/data to be entered into a machine. The input interface(s) 150 can receive an input from a user (e.g., a person) or other entity. Any suitable input interface(s) 150 can be used, including, for example, a keypad, display, touch screen, multi-touch screen, button, joystick, mouse, trackball, microphone, gesture recognition (radar, lidar, camera, or ultrasound-based), and/or combinations thereof.

The system 100 can include one or more output interfaces 155. An "output interface" includes any device, component, system, element or arrangement or groups thereof that enable information/data to be presented to a user (e.g., a person) or other entity. The output interface(s) 155 can present information/data to a user or other entity. The output interface(s) 155 can include a display, an earphone, a haptic device, a projector, and/or speaker. Some components of the system 100 may serve as both a component of the input interface(s) 150 and a component of the output interface(s) 155. In some arrangements, the display(s) 120 can be a part of the input interface(s) 150 and/or the output interface(s) 155.

The system 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or additionally, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The system 100 can include one or more object identification modules 160. The object identification module(s) 160 can analyze sensor data captured by the sensor(s) 130 (e.g., the driving environment sensor(s) 134) to detect, identify, and/or classify an object. The object identification module(s) 160 can use any suitable technique, including, for example, template matching and other kinds of computer vision and/or image processing techniques and/or other artificial or computational intelligence algorithms or machine learning methods. The object identification module(s) 160 can include any suitable object recognition software. The object identification module(s) 160 can query the object image database for possible matches. For instance, images captured by the driving environment sensor(s) 134 (such as cameras) can be compared to images in the object data 116 for possible matches. Alternatively or additionally, measurements or other aspects of an object in the vehicle cabin data can be compared to measurements or other aspects of any images in the object data 116.

The object identification module(s) 160 can identify a detected object as a particular object if there is a match between the captured image/data of the object and an image or data in the object data 116. "Match" or "matches" means that an image or other information collected by the vehicle sensor(s) 132 and one or more of the images or other information in the object data 116 are substantially identical. For instance, an image or other information collected by the vehicle sensor(s) 132 and one or more of the images or other information in the object data 116 can match within a predetermined probability (e.g., at least about 85%, at least about 90%, at least about 95% or greater) or confidence level. In one or more arrangements, the detected object can be compared to identifying features of an object, such as color measured visually, shape, size, movement, sounds, etc.

Alternatively or additionally, the object identification module(s) 160 can use semantic segmentation on the video captured by the driving environment sensor(s) 134. Thus, the object identification module(s) 160 can interpret pixels in the video into a semantic meaning. The object identification module(s) 160 can be configured to define or label individual pixels in the video as belonging to an individual object.

The object identification module(s) 160 can be configured to classify an identified object as a critical object or a non-critical object. A critical object can include an object or area that is important to a person's ability to safely operate the vehicle. A non-critical object can include an object or an area that that is not important to a person's ability to safely operate the vehicle or an object or area that could be hazardous to a person's ability to safely operate the vehicle. The object identification module(s) 160 can do so based on classification information stored in the object data 116. However, the object identification module(s) 160 can do so in any suitable manner.

The system 100 can include one or more risk level modules 170. The risk level module(s) 170 can analyze data to determine a risk level of an external environment of the vehicle. The data can include sensor data captured by the sensor(s) 130 (e.g., the driving environment sensor(s) 134), information received by the transceiver(s) 145, and/or data or information from other sources. "External environment" means at least a portion of the external environment surrounding the vehicle. The external environment can be located within a predetermined distance from the vehicle 105. In one or more arrangements, the predetermined distance can be established by the sensing range of the sensor(s) 130 of the vehicle 105. The external environment can include any information about the external environment, including, for example, the presence and/or location of one or more objects in the environment, the identity and/or nature of the objects, traffic conditions and/or weather conditions. Such data or information about the external environment can be obtained from the sensor(s) 130 (e.g., the driving environment sensor(s) 134) and/or from any other suitable source (e.g., websites, databases, etc.). The risk level can be the risk level of the external environment itself and/or the risk level to the vehicle 105. The risk level module(s) 170 can determine the risk level in various ways. Some examples are described in turn below.

In one or more arrangements, the risk level module(s) 170 can determine the risk level based on a complexity of the external environment of the vehicle 105. The complexity of the external environment can be classified in various ways and/or by various methods. The complexity of the external environment can be defined in any suitable manner. For example, in one or more arrangements, the classifications of the external environment can include a low complexity environment and a high complexity environment. While arrangements will be described herein with respect to low complexity and high complexity environments, it will be understood that these classifications are provided merely as examples. Indeed, there can be additional types of classifications (e.g., one or more medium complexity environments). Further, there can be entirely different types of classifications for the external environment.

If the risk level module(s) 170 determines that the external environment is high complexity, then the risk level module(s) 170 can determine that the risk level of the external environment is high. If the risk level module(s) 170 determines that external environment is low complexity, then the risk level module(s) 170 can determine that the risk level of the external environment is low.

The complexity of an external environment can be classified based on one or more suitable factors. For instance, the external environment can be classified as low complexity if a relatively small number of objects is detected in the external environment, a relatively low density of objects is detected in the external environment, the objects detected in the external environment are detected as moving in a relatively small number of different directions, a relatively small number of different types of objects is detected in the external environment, a relatively small number of a particular type of object is detected in the external environment (e.g., a relatively small number of vehicles, a relatively small number of pedestrians, etc.), a relatively small amount of occlusions of individual objects in the external environment is detected, and/or a high degree of agreement in data captured by the sensor system is attained.

Further, the external environment can be classified as a high complexity if a relatively large number of objects is detected in the external environment, a relatively high density of objects is detected in the external environment of the vehicle 105, the objects detected in the external environment are detected as moving in a relatively large number of different directions, a relatively large number of different types of objects is detected in the external environment, a relatively large number of a particular type of object is detected in the external environment (e.g., a relatively large number of vehicles, a relatively large number of pedestrians, etc.), a relatively large amount of occlusions of individual objects in the external environment is detected, and/or a low degree of agreement in data captured by the sensor system of the vehicle is attained. Each of these various potential factors will be addressed in turn below.

With respect to the number of objects in the external environment, a detected quantity objects in the external environment can be compared to a predetermined quantity of objects. For instance, the predetermined quantity of objects can be 10 or fewer, 5 or fewer, or 3 or fewer, just to name a few possibilities. Thus, if the quantity of detected objects is at or below the predetermined quantity of objects, the external environment can be considered to be low complexity. If the quantity of detected objects is above the predetermined quantity of objects, the external environment can be classified as a high complexity environment or some other non-low complexity classification. As an example, if no objects (e.g., vehicles) are detected in the external environment, then, in one or more arrangements, the external environment can be classified as a low complexity environment.

With respect to the density of objects in the external environment, a detected density (e.g., a quantity of objects located in a given area) can be compared to a predetermined density (e.g., a predetermined quantity of objects for a given area). If the detected density is less than or equal to the predetermined density, then the external environment can be classified as a low complexity environment. If the detected density is greater than the predetermined density, the external environment can be classified as a high complexity environment or some other non-low complexity classification.

Further, the complexity of the external environment can be classified with respect to the number of different directions in which detected objects are moving. The direction of movement of detected objects in the external environment can be detected by one or more sensors of the sensor system 125. The total number of different directions of movement of such objects can be determined. The total number of different directions of movement can be compared to a predetermined number of directions of movement. If the detected number of different directions of movement is less than or equal to the predetermined number of directions of movement, the external environment can be classified as a low complexity environment. If the quantity of detected objects is above the predetermined quantity of objects, the external environment can be classified as a high complexity environment or some other non-low complexity classification. The predetermined number of directions can be any suitable value, such as 5 or less, 4 or less, 3 or less, 2 or less, or 1.

The complexity of the external environment can be classified with respect to the number of different types of objects in the external environment. For instance, the vehicle 105 can be configured to determine the general type of one or more objects detected in the external environment. For instance, the vehicle 105 can determine whether a detected object is a vehicle, a pedestrian, a bicyclist, a motorcyclist, just to name a few possibilities. Once the general type of the detected objects is determined, the total number of different types of objects can be determined. The total number of different types of objects can be compared to a predetermined number of different types of objects. If the detected number of different types of objects is less than or equal to the predetermined number of different types of objects, the external environment can be classified as a low complexity environment. If the determined number of different types of objects is greater than the predetermined number of different types of objects, the external environment can be classified as a high complexity environment or some other non-low complexity classification. The predetermined number of different types of objects can be any suitable value, such as 3 or less, 2 or less, or 1.

The complexity of the external environment can be classified with respect to the number of a particular type of object in the external environment. For instance, the vehicle 105 can be configured to determine the general type of one or more objects detected in the external environment. For instance, the vehicle 105 can determine whether a detected object is a vehicle, a pedestrian, a bicyclist, a motorcyclist, just to name a few possibilities. Once the general type of the detected objects is determined, the total number objects of a particular type can be determined. The total number of objects of a particular type can be compared to a predetermined number of objects of a particular type. If the detected number of objects of a particular type is less than or equal to the predetermined number of objects of a particular type, the external environment can be classified as a low complexity environment. If the determined number of objects of a particular type is greater than the predetermined number of objects of a particular type, the external environment can be classified as a high complexity environment or some other non-low complexity classification. The predetermined number of objects of a particular type can be any suitable value, such as 10 or fewer, 5 or fewer, or 3 or fewer, just to name a few possibilities.

The complexity of the external environment can be classified with respect to the number of occlusions of individual objects in the external environment. Generally, as the number of occlusions decreases, the ease of interpretation and assessment of data from the sensor(s) 130 increases. A detected number of occlusions can be compared to a predetermined number of occlusions. For instance, the predetermined number of occlusions can be 5 or fewer, 4 or fewer, or 3 or fewer, 2 or fewer or 1, just to name a few possibilities. Thus, if the detected number of occlusions is less than or equal to the predetermined number of occlusions, the external environment can be classified as a low complexity environment. If the detected number of occlusions is greater than the predetermined number of occlusions, the external environment can be classified as a high complexity environment or some other non-low complexity classification.

The complexity of the external environment can be classified with respect to the degree of agreement in data acquired by the sensor(s) 130 (e.g., the driving environment sensor(s) 134). If data acquired by the sensor(s) 130 is identical or matches within a predetermined probability (e.g., about 85% or greater, about 90% or greater, about 95% or greater, etc.) or confidence level, the external environment can be classified as being a low complexity environment. However, if data acquired by the sensor(s) 130 is not identical or does not match within a predetermined probability or confidence level, then the external environment can be classified as being a high complexity environment.

Of course, it will be understood that the classification of the external environment can be made with respect to any combination of the above factors. Further, the classification of the external environment can be made with respect to any combination of one or more of the above factors with one or more others factors not listed above. Still further, the classification of the external environment can be made with respect to any one or more other factors not listed above. As an example, in one or more arrangements, the number of detected objects and the number of directions in which such detected objects are moving can be used together to classify the external environment. For instance, if there are 15 detected objects and all of the detected objects are determined to be moving in substantially the same direction, then the environment may be classified as a low complexity environment. In contrast, if there are 15 detected objects and the detected objects are moving in a total of 7 different directions, then the external environment may be classified as a high complexity environment.

In one or more arrangements, the risk level module(s) 170 can determine the risk level based on a likelihood of the vehicle 105 being impinged upon by another object in the external environment of the vehicle. The risk level module(s) 170 can be configured to detect, analyze, assess and/or interpret information about detected objects and/or the vehicle 105 itself to determine whether such objects and the vehicle 105 will impinge upon each other. "Impinge upon" refers to an object and/or the vehicle moving in such a manner that would cause them to come substantially close to each other. "Substantially close" means that the vehicle and the object directly contact each other, will directly contact each other, be located within a predetermined distance of each other, and/or will be located within a predetermined distance of each other. The predetermined distance can be any suitable distance, including, for example, about 20 feet or less, about 15 feet or less, about 10 feet or less, about 5 feet or less, about 4 feet or less, about 3 feet or less, about 2 feet or less or about 1 foot or less.

The determination of whether a detected object will impinge upon the vehicle 105 can be made in any suitable manner. For instance, in one or more arrangements, the risk level module(s) 170 can predict whether the object and the vehicle 105 will come substantially close to each other. Such a prediction can be made based on one or more factors, including, for example, the current travel route of the vehicle 105, the current location of the vehicle 105, a predicted future location of the vehicle 105, the current trajectory of the vehicle 105, a predicted trajectory of the vehicle 105, the current speed of the vehicle 105, a future speed of the vehicle 105, the current driving maneuver(s) of the vehicle 105, future driving maneuver(s) of the vehicle 105, the past, current, or future location of the object, the current or future trajectory of the object, and/or the past or current speed of the object, just to name a few possibilities. In one or more arrangements, artificial or computational intelligence algorithms or machine learning approaches can be used for predicting whether the object and the vehicle 105 will come substantially close to each other and/or for determining one or more predicted factors. If it is predicted that the object and the vehicle 105 will be substantially close to each other, then it can be determined that the object will impinge upon the vehicle 105.

Alternatively or additionally, the risk level module(s) 170 can determine whether an object will impinge upon the vehicle 105 based on the actual or predicted position and/or movement of the object. For instance, if the object moves at least partially into a current travel lane of the vehicle 105, then it can be determined that the turning object will impinge upon the vehicle 105. Alternatively or additionally, if the object is moving in manner that is predicted to result in the object moving at least partially into the current travel lane of the vehicle 105, then it can be determined that the turning object will impinge upon the vehicle 105.

If the risk level module(s) 170 determines that the object and the vehicle 105 will impinge upon each other, then the risk level module(s) 170 can determine that the risk level of the external environment is high. If the risk level module(s) 170 determines that the object and the vehicle 105 will not impinge upon each other, then the risk level module(s) 170 can determine that the risk level of the external environment is low. It will be appreciated that the risk level module(s) 170 can classify the risk level based on any suitable number of labels (e.g., low, high, medium, etc.), but it can also classify the risk level in other ways. For example, the risk level module(s) 170 can assign a numerical value to the risk level. The numerical value can be compared to a threshold to determine whether the risk level warrants any further action by the system 100. The risk level can be assessed for individual objects in the external environment of the vehicle and/or the risk level can be assessed collectively for objects in the environment.

Of course, it will be understood that the impingement determination be made with respect to any combination of the above factors. Further, the impingement determination can be made with respect to any combination of one or more of the above factors with one or more others factors not listed above. Still further, the impingement determination can be made with respect to any one or more other factors not listed above.

In one or more arrangements, the risk level module(s) 170 can be configured to determine the risk level based on a behavior of one or more vehicles in the external environment of the vehicle. For example, the risk level module(s) 170 can be configured to determine whether a detected object is moving in compliance with one or more traffic rules. The risk level module(s) 170 can be operatively connected to access the traffic rules data 118. The risk level module(s) 170 can be configured to determine whether an object is moving in manner that violates a traffic rule. Examples of traffic rule violations can include traveling at a speed that exceeds the current posted speed limit, passing through a stop sign or a red traffic signal without stopping, and/or failing to drive within a single travel lane, just to name a few possibilities.

If an object is detected or determined to be violating one or more traffic rules, then it can be determined that the risk level of the external environment is high. If an object is detected or determined to be not violating one or more traffic rules, then it can be determined that the risk level of the external environment is low.

As another example, the risk level module(s) 170 can determine whether the movement of an object is erratic. For instance, an object can be considered to be moving erratically if it is moving in a swerving manner, sliding manner or other erratic manner. Swerving or erratic movement can be identified by comparing the detected movement of an object to a set of predefined erratic movement profiles. In one or more arrangements, the set of predefined erratic movement profiles can be included as part of one or more of the data stores 115. In one or more arrangements, the set of predefined erratic movement profiles can be included as part of the risk level module(s) 170. In one or more arrangements, one or more of the predefined erratic movement profiles can be directed to sliding motions, such as may occur when an object is moving on a wet, icy, or snowy road. In one or more arrangements, one or more of the predefined erratic movement profiles can be directed to swerving motions, such as may occur when an object (e.g., a vehicle) is being operated by an intoxicated, drowsy and/or distracted driver.

In one or more arrangements, the risk level module(s) 170 can be configured to compare the detected movement of an object to a set of predefined erratic movement profiles to determine if there is a match. Match" or "matches" means that the detected movement of an object and one of the predefined erratic movement profiles in the set of predefined erratic movement profiles are identical. In some embodiments, "match" or "matches" can also mean that the detected movement of the object and one of the predefined erratic movement profiles in the set of predefined erratic movement profiles are substantially identical. For instance, the detected movement of the object and one of the predefined erratic movement profiles in the set of predefined erratic movement profiles can match within a predetermined probability (e.g., at least about 85%, at least about 90%, at least about 95% or greater) or confidence level. In one or more arrangements, the determination of the extent to which the detected movement of the object matches with one of the predefined erratic movement profiles can be performed using artificial or computational intelligence algorithms or machine learning methods.

If an object is detected or determined to be moving in an erratic manner, then it can be determined that the risk level of the external environment is high. If an object is detected or determined not to be moving in an erratic manner, then it can be determined that the risk level of the external environment is low.

It will be appreciated that the risk level module(s) 170 can classify the risk level based on any suitable number of labels (e.g., low, high, medium, etc.), but it can also classify the risk level in other ways. For example, the risk level module(s) 170 can assign a numerical value to the risk level. The numerical value can be compared to a threshold to determine whether the risk level warrants any further action by the system 100. The risk level can be assessed based on the behavior of individual objects in the external environment of the vehicle and/or the risk level can be assessed collectively based on the behavior of the objects in the external environment.

Of course, it will be understood that the classification of the behavior of vehicle(s) in the external environment can be made with respect to any combination of the above factors. Further, the classification of the behavior of vehicle(s) in the external environment can be made with respect to any combination of one or more of the above factors with one or more others factors not listed above. Still further, the classification of the behavior of vehicle(s) in the external environment can be made with respect to any one or more other factors not listed above.

In one or more arrangements, the risk level module(s) 170 can be configured to determine the risk level based on an operational mode of one or more vehicles in the external environment of the vehicle 105. The risk level module(s) 170 can be configured to receive operational mode information from other vehicles in the external environment. The operational mode information can be received by the transceiver(s) 145. In some arrangements, the operational mode information can be sent automatically by the one or more vehicle in the external environment. In some arrangements, the operational mode information can be sent in response to an inquiry sent by the vehicle 105. The risk level module(s) 170 can cause the inquiry to be sent to the other vehicles by the transceiver(s) 145.

If a sufficient quantity or percentage of vehicles in the external environment are being operated at or the equivalent of SAE Levels 0-2 or 0-3, then it can be determined that the risk level of the external environment is high. If a sufficient quantity or percentage of vehicles in the external environment are being operated at or the equivalent of SAE Levels 4-5, then it can be determined that the risk level of the external environment is low.

Of course, it will be understood that the determination of the risk level based on an operational mode of one or more vehicles in the external environment can be made with respect to any combination of the above factors. Further, the determination of the risk level based on an operational mode of one or more vehicles in the external environment can be made with respect to any combination of one or more of the above factors with one or more others factors not listed above. Still further, the determination of the risk level based on an operational mode of one or more vehicles in the external environment can be made with respect to any one or more other factors not listed above.

The system 100 can include one or more extended reality (XR) modules 180. The XR module(s) 180 can be configured to apply one or more XR elements to the video captured by the driving environment sensor(s) 134 such that, when the video is presented on the display(s) 120, the video includes only augmented elements or a combination of real-world and augmented elements. The XR module(s) 180 can do so based on objects detected, identified, labelled, and/or classified by the object identification module(s) 160.

In some arrangements, the XR module(s) 180 can be configured to apply augmentation to real-world objects and/or environment in the video. In some arrangements, the XR module(s) 180 can do so automatically or in response to a user command. The XR module(s) 180 can apply augmentation to individual objects in the video, categories of objects in the video (e.g., all cars, all trees, etc.), or based on any distinction (e.g., living v. non-living objects, critical v. non-critical objects, etc.). In some arrangements, the XR module(s) 180 can be configured to include augmentation to the video that does not correspond to a real-world object.

The augmentation can have any suitable form. For instance, in some arrangements, the augmentation can be in the form of virtual overlays. The virtual overlays can be a solid block of a particular color. As another example, the virtual overlays can be a cartoonish version of the corresponding real-world object. In some arrangements, the virtual overlays can be of a particular style. To that end, the XR module(s) 180 can include a style algorithm.

A style can be a manner of presentation according to a particular theme or motif. As an example, the style can be a style in which real-world objects in the video can be replaced or covered by virtual overlays consistent with the works of a particular artist or art movement (e.g., a Vincent Van Gogh style or an impressionist style). As another example, the style can be of a particular movie in which real-world objects in the video can be replaced or covered by virtual overlays in the style of a particular movie or television program (e.g., a Star Wars style). As still another example, the style can be a time period style in which real-world objects in the video can be replaced or covered by XR overlays in the style of corresponding objects in a particular time period (e.g., the 1930s, the 1980s, $19^{th}$ century, the future, period costume, vintage car, etc.). As still another example, the style can be a location style in which real-world objects in the video can be replaced or covered by XR overlays in the style of corresponding objects in a particular setting (e.g., tropical island, desert, etc.). Of course, it will be appreciated that the above examples of styles are not meant to be limiting as there are numerous possibilities for styles that can be applied to real-world content.

The application of the styles can be pre-determined, based on inputs or commands by a user or other entity, or even randomly. It will be appreciated that the styles can be applied to the video globally or to certain objects and/or environment in the video. For example, any objects in the real-world video that are replaced or overlaid by an XR overlay can be in Van Gogh style. Alternatively, the styles can be applied to categories of objects. For example, vehicles can have a Star Wars style applied to them while pedestrians can have a Van Gogh style applied to them. Still alternatively, the styles can be applied to individual objects. For example, one or more vehicles can have a Van Gogh style applied to them, one or more vehicles can have a Star Wars style applied to them, and one or more vehicles can have a 1930s style applied to them.

There can be an initial or default level of augmentation applied to the video. The initial level of augmentation can be a pre-determined, based on inputs or commands by a user or other entity, randomly assigned, or determined based on real-time conditions. In one or more arrangements, the initial level of augmentation can include all real-world objects and environment in the video having an XR overlays and/or other augmentation. In one or more arrangements, the initial level of augmentation can be one or more categories of objects having an XR overlay and/or other augmentation. In some arrangements, the system 100 can be configured to prompt a user of the display(s) 120 as to whether augmentation is desired and/or for the desired level of augmentation.

It will be appreciated that the level of augmentation applied to the video can vary over time based on real-time conditions. For example, the level of augmentation applied to the video can vary over time based on a risk level of an external environment of the vehicle. The risk level can be determined by the risk level module(s) 170.

The risk level module(s) 170 and/or the XR module(s) 180 can be configured to analyze the determined risk level. For example, the XR module(s) 180 can be configured to compare the determined risk level to a threshold. As another example, the risk level module(s) 170 can indicate to the XR module(s) 180 whether the risk level is high or low. If the determined level of risk is low or does not meet a risk threshold, the XR module(s) 180 can be configured to increase the level of augmentation to the video or to maintain a current level of augmentation to the video. If the determined level of risk high or meets the risk threshold, the XR module(s) 180 can be configured to decrease the level of augmentation in the video. Decreasing the level of augmentation in the video can include reducing the number of augmented objects in the video. Decreasing the level of augmentation in the video can include removing XR overlays applied to any critical objects and/or portions of the environment in the video. For instance, if a pedestrian is crossing the road in a crosswalk located in front of the vehicle 105, any XR overlays on the pedestrian and/or the crosswalk can be removed.

In some arrangements, the XR module(s) 180 can be configured to vary the level of augmentation based on other considerations. For instance, the XR module(s) 180 can be configured to increase the amount of augmentation when the vehicle is in an autonomous mode and minimal user input or when no user input is required. Alternatively or additionally, the XR module(s) 180 can be configured to decrease the amount of augmentation when the vehicle is in an autonomous mode and a critical user input is required. In some arrangements, the change in the amount of augmentation can be proportional to the level of risk in the external environment of the vehicle. In some arrangements, the change in the amount of augmentation can be based on pre-determined levels.

The system 100 can include one or more autonomous driving modules 190. The autonomous driving module(s) 190 can receive data from the sensor(s) 130 and/or any other type of system capable of capturing information relating to the vehicle 105 and/or the external environment of the vehicle 105. The autonomous driving module(s) 190 can determine position and velocity of the vehicle 105. The autonomous driving module(s) 190 can determine the location of objects, obstacles, or other environmental features including traffic signs, trees, shrubs, neighboring vehicles, pedestrians, etc.

The autonomous driving module(s) 190 can determine travel path(s), current autonomous driving maneuvers for the vehicle 105, future autonomous driving maneuvers and/or modifications to current autonomous driving maneuvers based on data acquired by the sensor(s) 130, driving scene models, and/or data from any other suitable source. "Driving maneuver" means one or more actions that affect the movement of a vehicle. Examples of driving maneuvers can include accelerating, decelerating, braking, turning, moving in a lateral direction of the vehicle 105, changing travel lanes, merging into a travel lane, and/or reversing, just to name a few possibilities. The autonomous driving module(s) 190 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 190 can execute various vehicle functions and/or to transmit data to, receive data from, interact with, and/or control the vehicle 105 or one or more systems thereof. In some arrangements, the autonomous driving module(s) 190 and/or the processor(s) 1110 can send signals to one or more actuators to modify, adjust and/or alter one or more vehicle systems or components thereof. The actuators can include motors, pneumatic actuators, hydraulic pistons, relays, solenoids, and/or piezoelectric actuators, just to name a few possibilities.

The processor(s) 110 and/or the autonomous driving module(s) 190 can be operatively connected to communicate with various vehicle systems and/or individual components thereof. For example, the processor(s) 110 and/or the autonomous driving module(s) 190 can be in communication to send and/or receive information from various vehicle systems to control the movement, speed, maneuvering, heading, direction, etc. of the vehicle 105. The processor(s) 110 and/or the autonomous driving module(s) 190 may control some or all of these vehicle systems and, thus, may be partially or fully autonomous. For instance, when operating in an autonomous mode, the processor(s) 110 and/or the autonomous driving module(s) 290 can control the direction and/or speed of the vehicle 105. The processor(s) 110 and/or the autonomous driving module(s) 190 can cause the vehicle 105 to accelerate (e.g., by increasing the supply of fuel provided to the engine), decelerate (e.g., by decreasing the supply of fuel to the engine and/or by applying brakes) and/or change direction (e.g., by turning the front two wheels).

The various elements of the system 100 can be communicatively linked through one or more communication networks 195. As used herein, the term "communicatively linked" can include direct or indirect connections through a communication channel or pathway or another component or system. A "communication network" means one or more components designed to transmit and/or receive information from one source to another. The communication network(s) 195 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 195 further can be implemented as or include one or more wireless networks, whether short or long range. For example, in terms of short-range wireless networks, the communication network(s) 195 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long-range wireless networks, the communication network(s) 195 can include a mobile, cellular, and or satellite-based wireless network and support voice, video, text, and/or any combination thereof. Examples of long-range wireless networks can include GSM, TDMA, CDMA, WCDMA networks or the like. The communication network(s) 195 can include wired communication links and/or wireless communication links. The communication network(s) 195 can include any combination of the above networks and/or other types of networks. The communication network(s) 195 can include one or more routers, switches, access points, wireless access points, and/or the like.

One or more elements of the system 100 can include and/or can execute suitable communication software, which enables two or more of the elements to communicate with each other through the communication network(s) 195 and perform the functions disclosed herein.

Now that the various potential systems, devices, elements and/or components of a distracted driver notification system have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 2:
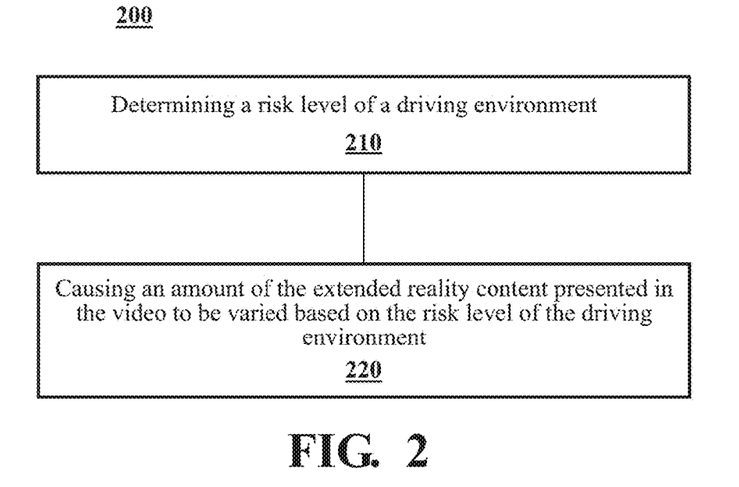
FIG. 2 is an example of a method of varying extended reality content.

Turning to FIG. 2, an example of a method 200 of varying extended reality content in a video presented on a display located within a vehicle is shown. The display can be a video pass through display. The video can present a view of an external environment of the vehicle. The video can include extended reality content.

At block 210, the method 200 can include determining a level of risk in the external environment of the vehicle. The level of risk can be determined by the risk level module(s) 170 and/or the processor(s) 110 using data acquired by the sensor(s) 130, such as the driving environment sensor(s) 134, or using data received by the transceiver(s) 145. The method 200 can proceed to block 220.

At block 220, an amount of extended reality content presented in the video can be caused to be varied based on the level of risk. The causing can be performed by the XR module(s) 180 and/or the processor(s) 110. In one or more arrangements, the XR module(s) 180 and/or the processor(s) 110 can compare the level of risk to a threshold. When the level of risk is below the threshold, the level of augmentation can remain at the same level or may even be increased. When the level of risk exceeds the threshold, the level of augmentation can be decreased.

The method 200 can end. Alternatively, the method 200 can return to block 210 or proceed to some other block. The method 200 can be performed continuously, periodically, irregularly, randomly, or responsive to a condition, event, or input. The method 200 can include additional and/or alternative steps to those describe above.

Figure 3:
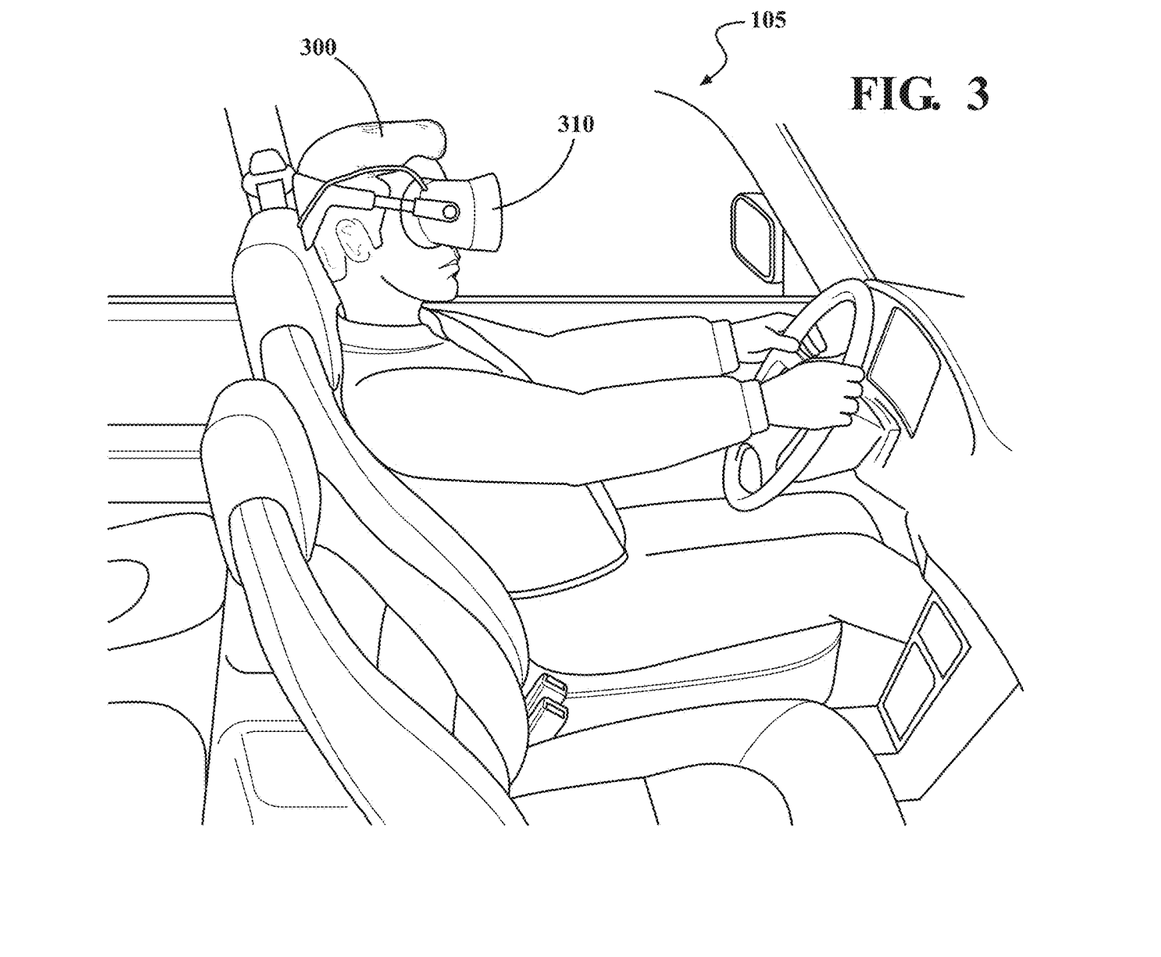
FIG. 3 is an example of a vehicle cabin with a driver wearing an extended reality (XR) headset.

A non-limiting example of the above-described systems, methods and/or arrangements will now be described. In this example, the vehicle 105 can include a human driver 300, as is shown in FIG. 3. The human driver 300 can be wearing an XR headset 310. The XR headset 310 can be a video pass through headset. The vehicle 105 can be operated in an autonomous operational mode (e.g., at SAE Level 3 or 4). Thus, while seated in the driver's seat, the human driver 300 is not actually driving the vehicle 105. Thus, the driver may not have her or her hands on the steering wheel.

The XR headset 310 can include one or more cameras. The cameras can capture in real-time video of the external environment generally corresponding to the perspective of the human driver 300. The captured video can be analyzed by the object identification module(s) 160 to detect one or more objects and/or the environment in the video. The XR module(s) 180 can augment the video by applying XR content to the video. For instance, XR overlays can be applied over one or more objects and/or one or more portions of the environment. The augmented video, which can include a mix of real-world content and extended reality content, can be presented on the headset.

Figure 4:
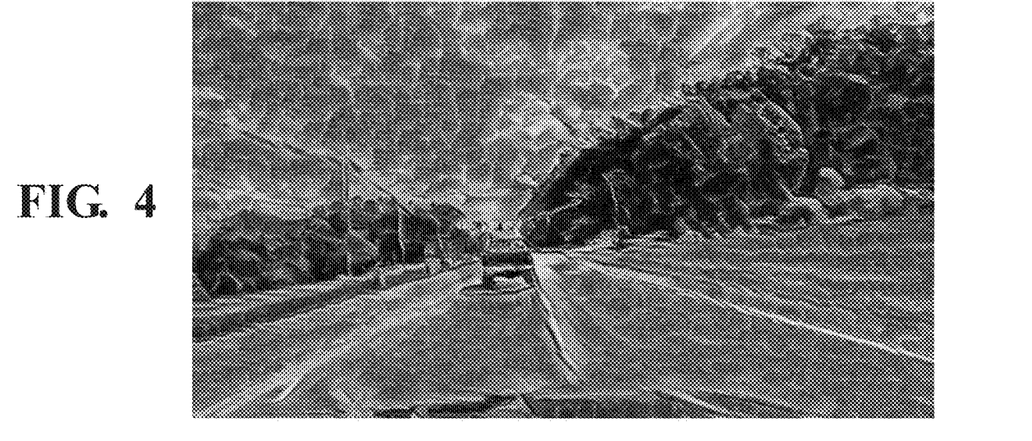
FIG. 4 is an example of a video presented on the XR headset, the video including a first amount of extended reality content.
Figure 5:
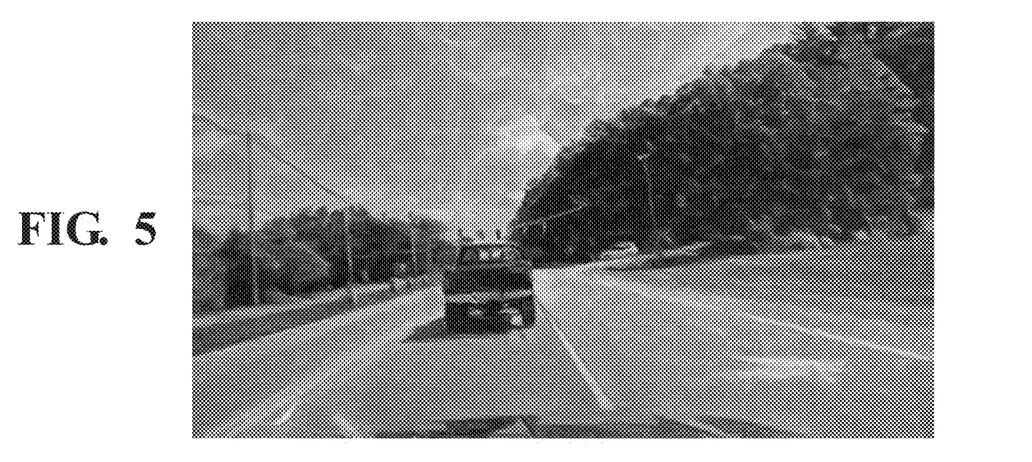
FIG. 5 is an example of a video presented on the XR headset, the video including a second amount of extended reality content, the second amount being less than the first amount.
Figure 6:
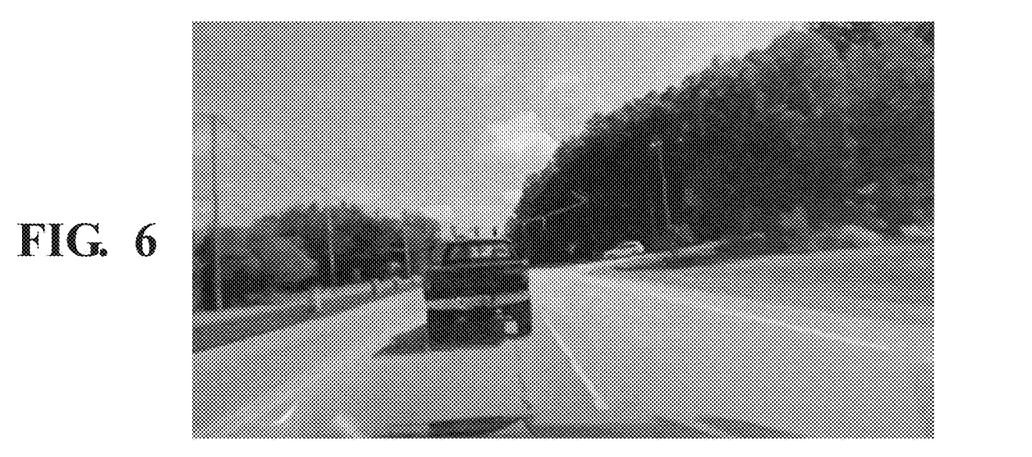
FIG. 6 is an example of a video presented on the XR headset, the video including a third amount of extended reality content, the third amount being less than the second amount.

FIGS. 4-6 shows an example of a video presented on the XR headset 310 at various levels of augmentation. Referring to FIG. 4, the video can include real-world video augmented at a first level of augmentation. In this example, the video can include a mix of real-world video and XR modification to one or more objects in the environment. In this example, the XR modification can be a Van Gogh style. At this point in time, the video can include a first amount of extended reality content. Here, the entire driving scene can be augmented with extended reality content.

As noted herein, the amount of extended reality content in the video can be varied based on real-time conditions (e.g., a level of risk of the external environment of the vehicle 105). For example, as the vehicle 105 moves through the environment, there may be a point in which the human driver 300 is required to take control of the vehicle 105 because the level of risk is high. If so, then the XR module(s) 180 can cause an amount of the extended reality content presented in the video to be varied based on the level of risk. Here, the level of extended reality content in the video can be decreased.

FIG. 5 shows an example of the video presented on the XR headset with a second amount of extended reality content. The second amount of extended reality content is less than the first amount of extended reality content. Here, some of the XR modifications are reduced or removed from a portion of the external environment, such as the preceding vehicle and the road. The XR modifications to the environment (e.g., the sky, trees, etc.) can remain or can be reduced (but less than the amount of reduction to the vehicle and the road). The decrease in amount of extended reality content can signal to the human driver 300 that he or she should pay greater attention to the external environment due to the level of risk.

If the risk level stays elevated or increases, then the FIG. 6 shows an example of the video presented on the XR headset with a third amount of extended reality content. The third amount of extended reality content is less than the second amount of extended reality content. Here, the XR modifications to the video can completely removed or significantly reduced.

Thus, it will be appreciated that in going from the FIG. 4 to FIG. 6, the level of extended reality content can be reduced proportional to the level of risk of the external environment of the vehicle 105. It will be appreciated that, as the risk level decreases, the level of extended reality content can be increased. Thus, the video can go from FIG. 6 to FIG. 5 or FIG. 4.

Figure 7:
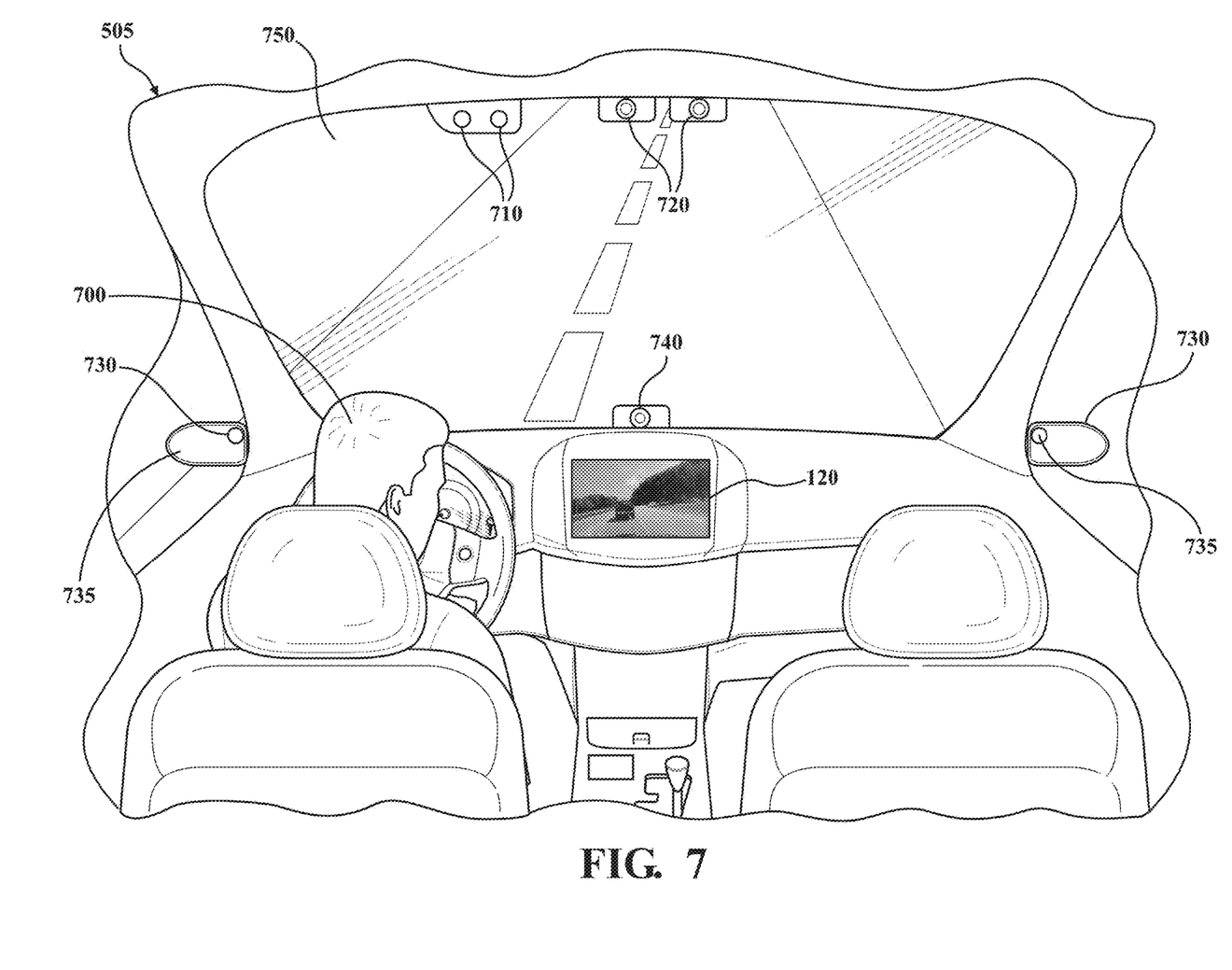
FIG. 7 is an example of a vehicle cabin including in-vehicle display presenting a video with extended reality content.

Another non-limiting example of the above-described systems, methods and/or arrangements will now be described in connection with FIG. 7. In this example, the vehicle 105 can include a human driver 700. The human driver 700 can be wearing an XR headset 310. The XR headset 310 can be a video pass through headset. The vehicle 105 can be operated in an autonomous operational mode (e.g., at SAE Level 3 or 4).

The vehicle 105 can include one or more cameras 710 configured to acquire driver gaze data (e.g., cameras positioned to acquire driver head position data, driver head orientation data, driver eye position data, driver eye orientation data, and/or eyelid data). The vehicle 105 can include one or more one or more cameras 720 configured to acquire vehicle cabin data, including data about one or more objects located within the cabin of the vehicle 105. In some arrangements, the vehicle 105 can include one or more cameras 730 in the side view mirrors 735 to acquire driver gaze data and/or vehicle cabin data. The vehicle 105 can include one or more cameras 740 or other sensors configured to acquire external environment data.

In this example the driver 512 of the vehicle 510 can be looking downwardly at a display 120 (e.g., an infotainment screen 520) that presents a video with extended reality content as described above. The extended reality content of the video can be varied as described above. The different amounts of extended reality content shown in FIGS. 4-6 applies to the arrangements in FIG. 7.

While the video is presented on the infotainment screen in this example, it will be appreciated that the video can be presented in other areas of the cabin. For instance, the video can be presented on a surface of the windshield 750 or dashboard of the vehicle 105. For example, the video can be a projection presented by one or more projectors located within the cabin. Alternatively, the projection can be presented on any other object within or surface of the vehicle 105.

It will be appreciated that arrangements described herein can provide numerous benefits, including one or more of the benefits mentioned herein. For example, arrangements described herein can allow for user entertainment. Arrangements described herein can alter the extended reality content in the video based on real-time conditions. Arrangements described herein can facilitate driving safety and vehicle occupant safety. Arrangements described herein can provide a closed loop feedback mechanism to determine the content to be displayed to a user. Arrangements described herein can vary the level of entertainment based on the risk level of the external environment of the vehicle.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

Aspects herein can be embodied in other forms without departing from the spirit or essential attributes thereof. Accordingly, reference should be made to the following claims, rather than to the foregoing specification, as indicating the scope hereof.

What is claimed is:

1. A method of varying extended reality content in a video presented on a display located within a vehicle, the display being a video pass through display, the video including extended reality content, the method comprising:
    determining a risk level of an external environment of the vehicle based on a complexity of the external environment of the vehicle, the complexity being based on at least one of: a number of objects detected in the external environment, a density of objects detected in the external environment, a number of different directions that objects detected in the external environment are moving, a number of different types of objects detected in the external environment, a number of a particular type of object detected in the external environment, an amount of occlusions of individual objects detected in the external environment, and a degree of agreement in data captured by one or more sensors of the vehicle; and
    causing an amount of the extended reality content presented in the video to be varied based on the risk level, the amount being proportional to the risk level of the external environment of the vehicle, the amount including:
        a number of augmented objects in the video; or
        a number of extended reality overlays over one or more objects and/or one or more portions of the external environment in the video,
        whereby varying the amount of extended reality content signals to a human driver that greater or lesser attention can be paid to the external environment due to the risk level.

2. The method of claim 1, further including:
    determining whether the risk level meets a threshold; and
    responsive to determining that the risk level meets the threshold, causing the amount of extended reality content presented in the video to be reduced.

3. The method of claim 1, wherein determining the risk level includes determining the risk level based on a likelihood of the vehicle being impinged upon by another object in the external environment of the vehicle.

4. The method of claim 1, wherein determining the risk level includes determining the risk level based on a complexity of the external environment of the vehicle.

5. The method of claim 1, wherein determining the risk level includes determining the risk level based on an operational mode of one or more vehicles in the external environment of the vehicle.

6. The method of claim 1, wherein determining the risk level includes determining the risk level based on a behavior of one or more vehicles in the external environment of the vehicle.

7. The method of claim 1, wherein the display is part of:
a head mounted display; or
an in-vehicle display.

8. The method of claim 1, further including:
capturing, using one or more cameras, video of an external environment of the vehicle;
augmenting with video with extended reality content; and
causing the video with extended reality content to be presented on the display.

9. The method of claim 1, wherein the extended reality content includes:
extended reality overlays over corresponding real-world objects or environment; or
extended reality modifications to real-world objects or environment.

10. The method of claim 9, wherein the extended reality content is applied in a selected style.

11. A system for varying extended reality content in a video, the system comprising:
a display located within a vehicle, the display being a video pass through display;
one or more cameras; and
one or more processors operatively connected to the one or more cameras and to the display, the one or more processors being programmed to initiate executable operations comprising:
causing the video captured by the one or more cameras to be presented on the display, the video including extended reality content;
determining a risk level of an external environment of the vehicle based on a complexity of the external environment of the vehicle, the complexity being based on at least one of: a number of objects detected in the external environment, a density of objects detected in the external environment, a number of different directions that objects detected in the external environment are moving, a number of different types of objects detected in the external environment, a number of a particular type of object detected in the external environment, an amount of occlusions of individual objects detected in the external environment, and a degree of agreement in data captured by one or more sensors of the vehicle; and
causing an amount of the extended reality content presented in the video to be varied based on the risk level, the amount being proportional to the risk level of the external environment of the vehicle, the amount including:
a number of augmented objects in the video; or
a number of extended reality overlays over one or more objects and/or one or more portions of the external environment in the video,
whereby varying the amount of extended reality content signals to a human driver that greater or lesser attention can be paid to the external environment due to the risk level.

12. The system of claim 11, further including:
determining whether the risk level meets a threshold; and
responsive to determining that the risk level meets the threshold, causing the amount of extended reality content presented in the video to be reduced.

13. The system of claim 11, wherein determining the risk level includes determining the risk level based on a likelihood of the vehicle being impinged upon by another object in the external environment of the vehicle.

14. The system of claim 11, wherein determining the risk level includes determining the risk level based on a complexity of the external environment of the vehicle.

15. The system of claim 11, wherein determining the risk level includes determining the risk level based on an operational mode of one or more vehicles in the external environment of the vehicle.

16. The system of claim 11, wherein determining the risk level includes determining the risk level based on a behavior of one or more vehicles in the external environment of the vehicle.

17. The system of claim 11, wherein the display is part of:
a head mounted display; or
an in-vehicle display.

18. The system of claim 11, wherein the extended reality content includes:
extended reality overlays over corresponding real-world objects or environment; or
extended reality modifications to real-world objects or environment.

19. The system of claim 18, wherein the extended reality content is applied in a selected style.

20. The system of claim 11, wherein the one or more cameras are mounted on the vehicle.

* * * * *